US012522209B2

(12) United States Patent
Meng et al.

(10) Patent No.: US 12,522,209 B2
(45) Date of Patent: Jan. 13, 2026

(54) NOVELTY MULTISENSORY DECISION GENERATING DEVICE AND METHOD

(71) Applicant: INSTITUTE FOR INFORMATION INDUSTRY, Taipei (TW)

(72) Inventors: I-Heng Meng, Taipei (TW); Jun-Dong Chang, Taipei (TW); Ai-Ting Chang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 174 days.

(21) Appl. No.: 18/523,918

(22) Filed: Nov. 30, 2023

(65) Prior Publication Data

US 2025/0153711 A1     May 15, 2025

(30) Foreign Application Priority Data

Nov. 14, 2023   (TW) .................................. 112143938

(51) Int. Cl.
*B60W 30/095*    (2012.01)
*G06V 10/774*    (2022.01)
(Continued)

(52) U.S. Cl.
CPC ....... *B60W 30/0956* (2013.01); *G06V 10/774* (2022.01); *G06V 20/58* (2022.01);
(Continued)

(58) Field of Classification Search
CPC ......... B60W 30/0956; B60W 2556/10; B60W 2556/45; G06V 20/58; G06V 10/774; G08G 1/0129
See application file for complete search history.

(56) References Cited

U.S. PATENT DOCUMENTS

| 11,673,557 B2* | 6/2023 | Lin ....................... G01S 17/931 |
| | | 701/23 |
| 11,731,663 B2* | 8/2023 | Zeng ................... B60W 40/072 |
| | | 701/23 |

(Continued)

FOREIGN PATENT DOCUMENTS

| CN | 112805198 A | 5/2021 |
| CN | 112888612 A | 6/2021 |

(Continued)

OTHER PUBLICATIONS

Machine translation of CN-117036595-A (Year: 2023).*

(Continued)

*Primary Examiner* — Kenneth M Dunne
(74) *Attorney, Agent, or Firm* — CKC & Partners Co., LLC (57) ABSTRACT

A decision generating device is configured to execute the following operations. A driving image of a vehicle and a driving status corresponding to the driving image are obtained. An image recognition is performed on the driving image by using an image recognition model to generate object information of objects in the driving image. A predictive driving information is generated based on the object information and the driving status by using a prediction model, the predictive driving information includes object movement predictions of the objects and a movement prediction of the vehicle, and the prediction model is generated based on a trained generative content model. A driving decision is generated based on the predictive driving information.

18 Claims, 4 Drawing Sheets

(51) Int. Cl.
*G06V 20/58* (2022.01)
*G08G 1/01* (2006.01)

(52) U.S. Cl.
CPC ..... *G08G 1/0129* (2013.01); *B60W 2554/404* (2020.02); *B60W 2556/10* (2020.02); *B60W 2556/45* (2020.02)

(56) References Cited

U.S. PATENT DOCUMENTS

| | | | | |
|---|---|---|---|---|
| 11,753,044 | B2* | 9/2023 | Honka | G05D 1/646 701/23 |
| 11,762,391 | B2* | 9/2023 | Cui | G06N 3/084 701/23 |
| 2023/0082654 | A1* | 3/2023 | Rezaee | G06N 3/092 701/23 |
| 2024/0001966 | A1* | 1/2024 | Jiang | G06V 20/56 |
| 2024/0419907 | A1* | 12/2024 | Laprise | G01C 21/34 |
| 2025/0029489 | A1* | 1/2025 | Cao | G08G 1/0133 |
| 2025/0118096 | A1* | 4/2025 | Schulter | G06V 20/56 |
| 2025/0200283 | A1* | 6/2025 | Wu | G06V 20/00 |

FOREIGN PATENT DOCUMENTS

| | | |
|---|---|---|
| CN | 116811918 A | 9/2023 |
| CN | 117036595 A * | 11/2023 |

OTHER PUBLICATIONS

Keysan et al, "Can you text what is happening? Integrating pre-trained language encoders into trajectory prediction models for autonomous driving.",2023, Arxiv (Year: 2023).*

Pahn-Minh et al; "CoverNet: Multimodal Behavior Prediction using Trajectory Sets", Apr. 2020, arXiv (Year: 2020).*

The office action of the corresponding Taiwan application No. TW112143938 issued on Dec. 9, 2024.

* cited by examiner

NOVELTY MULTISENSORY DECISION GENERATING DEVICE AND METHOD

CROSS-REFERENCE TO RELATED APPLICATION

This application claims priority to Taiwan Application Serial Number 112143938, filed Nov. 14, 2023, which is herein incorporated by reference in its entirety.

BACKGROUND

Field of Invention

The present disclosure relates to a decision generating device and method. More particularly, the present disclosure relates to a decision generating device and method based on generative-content models.

Description of Related Art

The main function of the advanced driver assistance systems (ADAS) currently installed on vehicles is to warn and/or control the vehicle in response to emergency situations, but it cannot predict possible risks in advance based on the situation and driving operations of the vehicle while driving, thereby failing to provide an advice of driving decisions.

In addition, most driving assistance technologies are based on general machine learning models, and the input data types and categories of the model are defined at the phase of training the machine learning model, and the input data cannot be expanded when the model is subsequently applied. On the other hand, for situations not included in the training phase, the machine learning model can perform judgment based on the closest generalized category in the training data. It can be seen that using machine learning models as the basis for driving assistance technology is less flexibility in the type of input data and the judgment of marginal situations.

In view of this, how to predict risks in driving situations and increase the flexibility of driving assistance technology is the goal that the industry strives to work on.

SUMMARY

The disclosure provides a decision generating device comprising a transceiver interface and a processor. The processor is electrically connected to the transceiver interface and configured to execute the following operations: receiving a driving image of a vehicle and a driving status corresponding to the driving image from the transceiver interface; performing an image recognition on the driving image by using an image recognition model to generate a plurality of object information of a plurality of objects in the driving image; generating a predictive driving information based on the object information and the driving status by using a prediction model, wherein the predictive driving information comprises a plurality of object movement predictions of the objects and a movement prediction of the vehicle, and the prediction model is generated based on a trained generative content model; and generating a driving decision based on the predictive driving information.

The disclosure further provides a decision generating method being adapted for use in a processor. The decision generating method 400 comprises the following steps: receiving a driving image of a vehicle and a driving status corresponding to the driving image; performing an image recognition on the driving image by using an image recognition model to generate a plurality of object information of a plurality of objects in the driving image; generating a predictive driving information based on the object information and the driving status by using a prediction model, wherein the predictive driving information comprises a plurality of object movement predictions of the objects and a movement prediction of the vehicle, and the prediction model is generated based on a trained generative content model; and generating a driving decision based on the predictive driving information.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
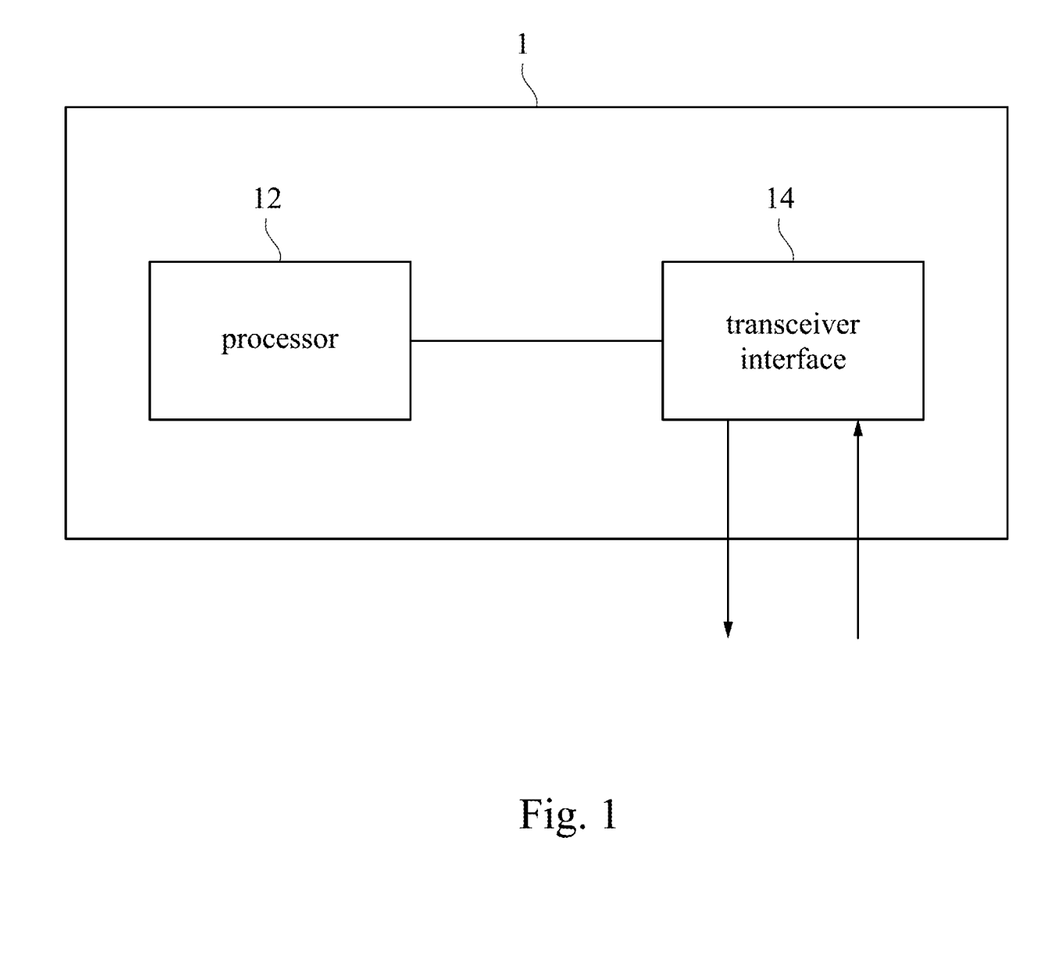
FIG. 1 is a schematic diagram illustrating a decision generating device according to some embodiments of the present disclosure.

Reference is made to FIG. 1. FIG. 1 is a schematic diagram illustrating a decision generating device 1 according to some embodiments of the present disclosure. The decision generating device 1 comprises a processor 12 and a transceiver interface 14, wherein the processor 12 is coupled to the transceiver interface 14.

In some embodiments, the processor 12 can comprise a central processing unit (CPU), a graphics processing unit (GPU), a multi-processor, a distributed processing system, an application specific integrated circuit (ASIC), and/or a suitable processing unit.

The transceiver interface 14 is configured to receive data of a vehicle, e.g., images outside the car, car speeds, rotation angles of the steering wheel, on or off statuses of the turn signal, operating statuses of the accelerator and the break, etc. In some embodiments, the transceiver interface 14 is configured to communicatively connected to cameras, speedometers, microphones, positioning units, vehicle computers, and/or other sensors. In some embodiments, the transceiver interface 14 can also comprise Ethernet, Wi-fi, or other network interfaces.

The decision generating device 1 is configured to generate a driving decision advice based on driving images and relative information of the vehicle. For example, when the vehicle deviates from the lane, too fast, or too close to other vehicles while driving, the decision generating device 1 can recognize objects and the status of the objects in the environment based on the driving images and generate the driving decision advice (e.g., changing driving direction, decelerate). In some embodiments, the decision generating device 1 can be a vehicle mounted device configured in the vehicle.

Figure 2:
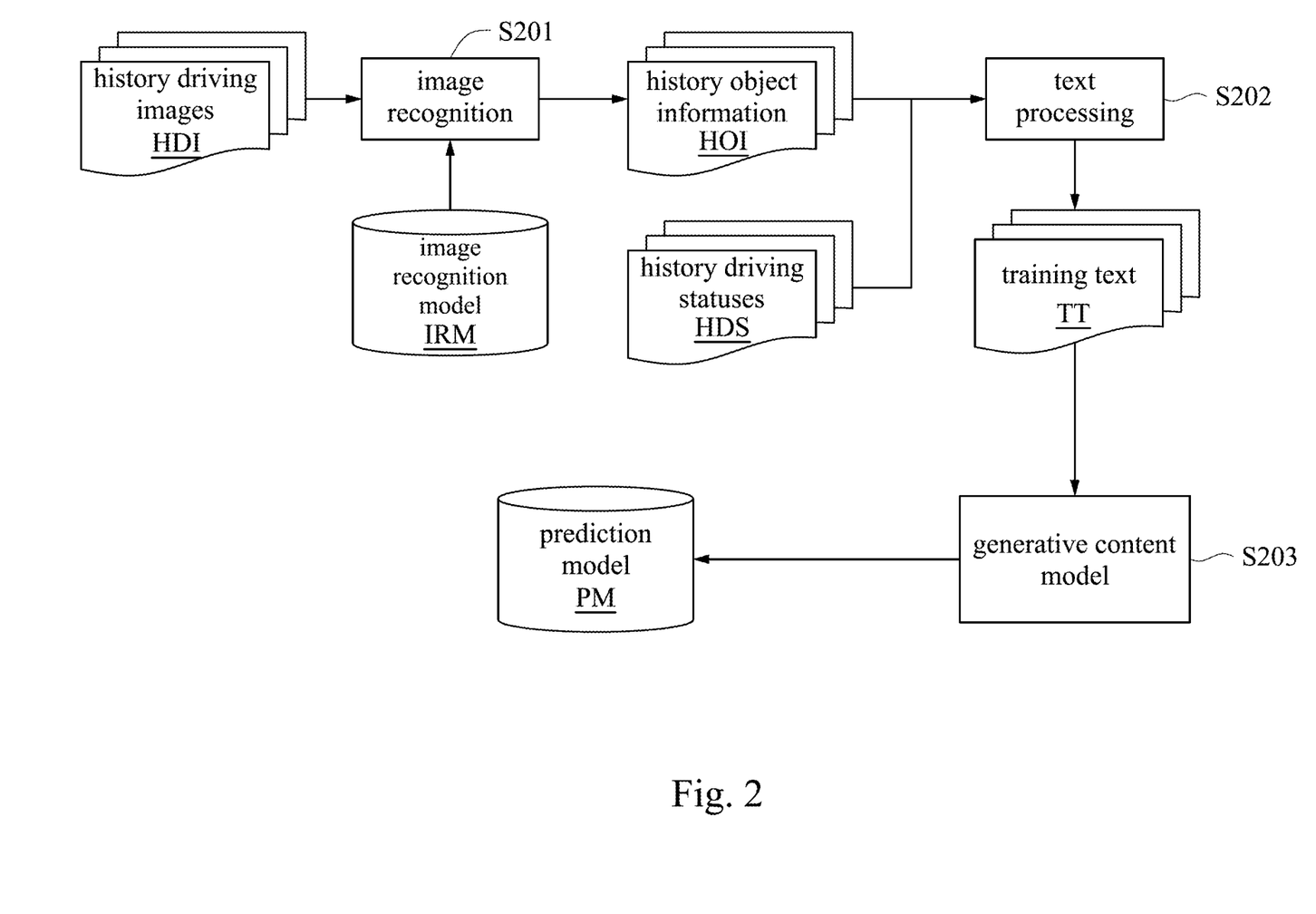
FIG. 2 is a flow diagram illustrating the decision generating device training a prediction model according to some embodiments of the present disclosure.

Reference is also made to FIG. 2. FIG. 2 is a flow diagram illustrating the decision generating device 1 training a prediction model PM according to some embodiments of the present disclosure.

In some embodiments, the decision generating device 1 further comprises a storage, the storage electrically connects to the processor 12, the storage is configured to store a plurality of history driving images HDI and a plurality of history driving statuses HDS corresponding to the history driving images HDI.

Specifically, the history driving images HDI are images records shot by cameras on vehicles during the vehicles driving on the road, and the history driving statuses HDS are vehicle status records such as speeds, operating statuses of the accelerator and the break while shooting the history driving images HDI. The history driving statuses HDS further comprises multiple sensing data record by sensors configured in the vehicle while the vehicle driving on the road in the past. The sensors comprise but are not limited to Lidar sensors, Radar sensors, thermal cameras, and sonar sensors. The sensing data comprises orientation, steering information, vehicle status data (e.g., operations corresponding to the history driving images HDI such as changing lanes and turning), and/or speed of the vehicle.

In some embodiments, the storage can comprise a semiconductor or solid-state memory, a magnetic tape, a removable computer diskette, a random-access memory (RAM), a read-only memory (ROM), a rigid magnetic disk, and/or an optical disk.

As shown in FIG. 2, the decision generating device 1 first executes the step S201, performing an image recognition on the history driving image HDI by using the image recognition model IRM to generate a plurality of history object information HOI of a plurality of history objects in the history driving image HDI.

Specifically, the processor 12 of the decision generating device 1 recognizes speeds, coordinates in the history driving images HDI, object attributes (e.g., vehicle types, road marking types), environment around the vehicle (e.g., weather, light and shadow, number of lanes), or other information (i.e., the history object information HOI) of objects such as vehicles, pedestrians, road markings, and obstacles.

In some embodiments, the processor 12 can mark the coordinates and the vectors configured to indicate the speeds and moving directions of the objects (i.e., the history object information HOI) in the history driving images HDI by using the image recognition model IRM.

Next, the decision generating device 1 trains a generative content model based on the history object information HOI and the history driving statuses HDS to generate the prediction model PM. For example, the generative content model can be generative pre-trained transformers (GPT), or a generative adversarial network (GAN), etc. Specifically, the decision generating device 1 can take the vehicle driving environment record in the history object information HOI and the vehicle driving status record in the history driving statuses HDS as training data to train the generative content model and take the trained generative content model as the prediction model PM.

It is noted that, comparing to general machine learning models, the generative content model has a higher flexibility in the input data. More specifically, the category of the valid input data can be recognized by general machine learning models in practical application needs to be the same as or similar to the category of the training data set used in the training phase. In other words, if the training data is set as a specific feature vector format comprising the object information in the images and the corresponding vehicle operating statuses, the trained model can only output an advice of vehicle operating referring to object information in the images in the feature vector format, but not other information beyond the feature vector format. In contrast, the trained generative content model can generate a certain degree of judgement accordingly after receiving data in a format that has not been trained (e.g., driving advice instructions, navigation routes) in the training phase.

In some embodiments, the operation of generating the prediction model PM further comprises the decision generating device 1 executing the step S202, the processor 12 performing a text processing to transform the history object information HOI and the history driving statuses HDS into a training text TT; and the decision generating device 1 executing the step S203, the processor 12 training the generative content model based on the training text TT to generate the prediction model PM.

In the step S202, the processor 12 can perform tokenization on the history object information HOI and the history driving statuses HDS to segment the description of the objects and the vehicle statuses in the history object information HOI and the history driving statuses HDS into smaller units (i.e., the training text TT) able to be processed by the generative content model. The tokens generated after the segmentation can be a word, a character, a subword, or a symbol, and the format of the tokens can be determined based on the type and the size of the model. The tokenization process can make the model process the input data in different languages, phrases, and formats more efficiently to reduce the cost of the calculations and the memories.

In some embodiments, the processor 12 can perform the tokenization process by using tokenization algorithm such as Rule-based Tokenization, Byte Pair Encoding (BPE), Unigram, WordPiece, etc.

Next, in the step S203, the processor 12 trains the generative content model by taking the training text TT as training data and take the trained generative content model as the prediction model PM.

After the training of the prediction model PM, the decision generating device 1 can predict possible driving risks and provide the driving decision advice based on the environment and vehicle information while driving by using the trained prediction model PM. Therefore, the processor 12 can receive a driving image DI of a vehicle and a driving status DS corresponding to the driving image DI from the transceiver interface 14 while the vehicle is driving. Specifically, the processor 12 can obtain images (i.e., the driving images DI) shot by cameras configured in the vehicle during the vehicles driving on the road from the transceiver interface 14. Also, the processor 12 can obtain information of the vehicle while the images are shot, such as the speed, satellite positioning, operating status of the accelerator and the break, etc. (i.e., the driving status DS).

Figure 3:
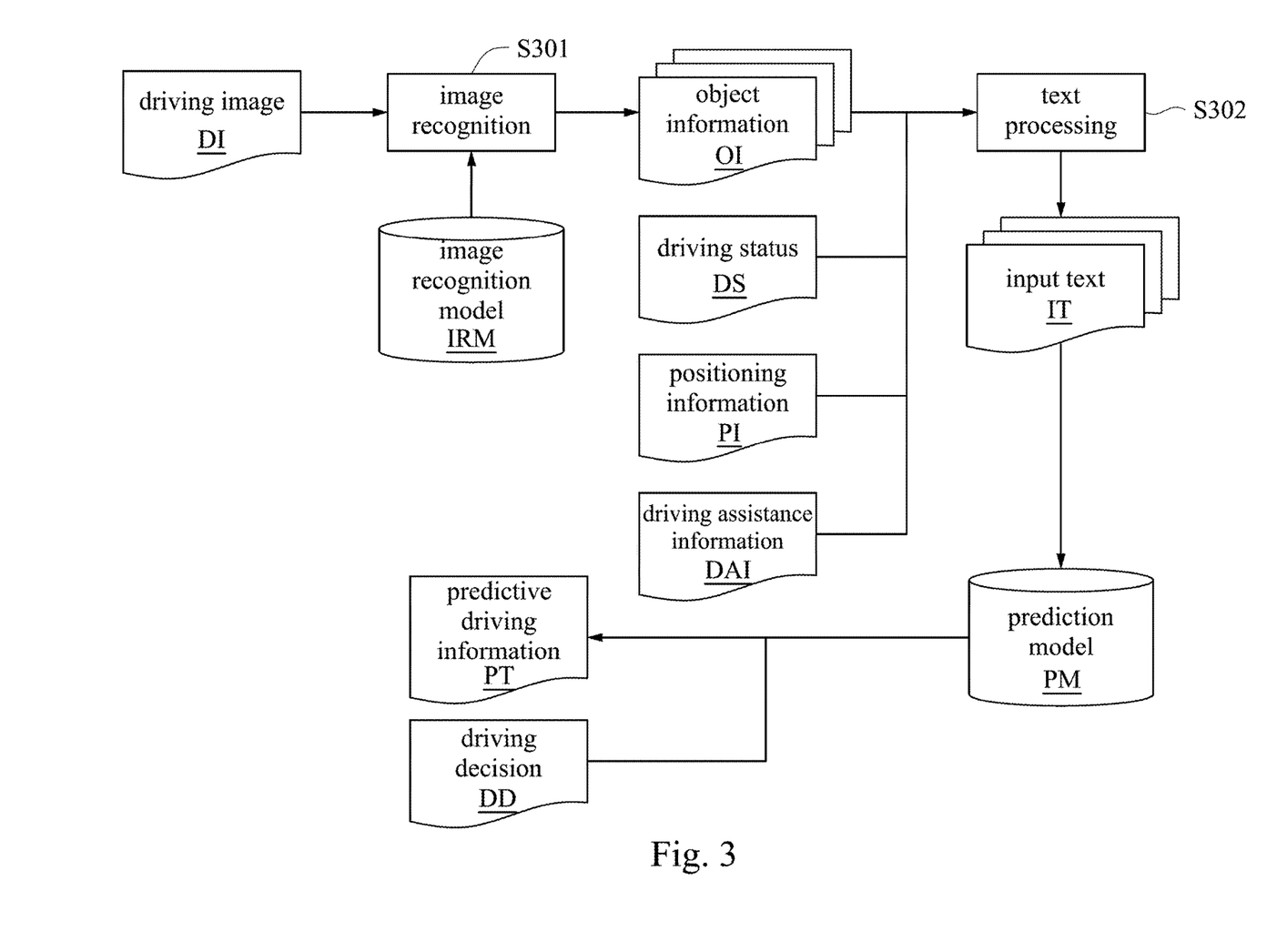
FIG. 3 is a schematic diagram illustrating the decision generating device generating a predictive driving information based on the prediction model according to some embodiments of the present disclosure.

After obtaining the driving images DI and the driving status DS, the operations about the decision generating device 1 generating the predictive driving information PT based on the prediction model PM are illustrated in FIG. 3.

As shown in FIG. 3, first, in the step S301, the processor 12 performs an image recognition on the driving image DI by using an image recognition model IRM to generate a plurality of object information OI of a plurality of objects in the driving image DI.

Next, the processor 12 generates a predictive driving information PT based on the object information OI and the driving status DS by using the prediction model PM, wherein the predictive driving information PT comprises a plurality of object movement predictions of the objects and a movement prediction of the vehicle.

Specifically, the processor 12 can input the object information OI and the driving status DS into the prediction model PM, and the prediction model PM can predict the future trajectories of the vehicle and the objects (i.e., the object movement predictions and the movement prediction) based on the current driving environment and vehicle status. Moreover, the movement prediction further comprises a future trajectory data of the vehicle in future. Correspondingly, the object movement predictions further comprise the future trajectory data of the objects in future. Specifically, the trajectory data further comprises the orientation, the steering information, the vehicle status data (e.g., operations corresponding to the driving images DI such as changing lanes and turning), and/or speed of the vehicle. Preferably, the processor 12 can also input a situational information, such as the weather, light, driving environment (highways, surface roads, or narrow alleys) while driving into the prediction model PM.

In some embodiments, the processor 12 can execute the step S302, performing a text processing to transform the object information OI and the driving status DS into an input text IT. Similar to the step S202 mentioned above, the processor 12 can perform tokenization on the object information OI and the driving statuses DS to generate the input text IT. Furthermore, after generating the input text IT, the processor 12 can then input the input text IT into the prediction model PM to generate the predictive driving information PT. In this embodiment, the predictive driving information PT is in a text format, but considering the different model types (e.g., text generation models, video generation models, or audio generation models), the predictive driving information PT can also be in a video format or an audio format.

In some embodiments, in addition to the object information OI and the driving status DS, the processor 12 can also generate the predictive driving information PT based on the positioning information PI of the vehicle and the driving auxiliary information DAI by using the prediction model PM, wherein the object information, the driving status, the positioning information, and the driving assistance information are transformed into an input text through a text processing.

For example, since the generative content model has the feature of extending the input data, the processor 12 can also input the satellite positioning information (i.e., the positioning information PI) while the vehicle is driving into the prediction model PM. Additionally, the processor 12 can also input the current navigation route and/or the driving instructions (e.g., avoiding highways) (i.e., the driving auxiliary information DAI) from the user into the prediction model PM. Accordingly, the prediction model PM can then generate the predictive driving information PT referring to different aspects of information, thereby taking the information as the reference of the driving decision advice. It is noticed that, if the positioning information PI and the driving auxiliary information DAI are not text data, the decision generating device 1 needs to transform the positioning information PI and the driving auxiliary information DAI into an input text through the text processing first, then input the input text into the prediction model PM.

Finally, the processor 12 generates a driving decision DD based on the predictive driving information PT.

Specifically, after the processor 12 generates the predictive driving information PT, the processor 12 can determine whether the vehicle exists accident risks (e.g., collision with other vehicle or obstacles, speeding, loss of control, rollover). Therefore, the processor 12 can further provide a driving decision advice (i.e., the driving decision DD) based on the prediction result (i.e., the predictive driving information PT). For example, if the predictive driving information PT indicates that there is an oncoming vehicle approaching quickly from the left and may enter the future path of our vehicle, the processor 12 can generate a driving decision advice of applying the break accordingly.

In some embodiments, the processor 12 can also generate the driving decision DD by using the prediction model PM. Since the prediction model PM has already obtained relative information of the driving environment and generating the predictive driving information PT, the prediction model PM can also generate the driving decision DD based on the prediction result of the predictive driving information PT. In other embodiments, the driving decision DD can be a paragraph of display text, explanatory voice, or controlling the vehicle computer of the vehicle via the processor 12.

In some embodiments, after generating the driving decision DD, the decision generating device 1 can also compare the driving decision DD with practical driving operation of the driver. If there is a specific difference between the driving decision advice generated by the prediction model PM and the driving operation of the driver (e.g., the driving decision DD indicates avoiding an obstacle to the left, but the driver stop the vehicle to avoid collision with the obstacle practically), the decision generating device 1 can take the current driving image, driving status, and driving operation of the driver as the reference to fine-tune the prediction model PM.

Specifically, the processor 12 of the decision generating device 1 compares the driving decision and a practical driving operation of the vehicle to generate an operation difference; and in response to the operation difference higher than a threshold, the processor 12 fine-tunes the prediction model based on the driving image, the driving status, and the practical driving operation corresponding to the driving decision.

In some embodiments, the decision generating device 1 can also generate images of a driving situation based on text description of the driving situation. Specifically, the processor 12 generates a time sequential situational image described by a situational text by using an image generating model based on the situational text, wherein the image generating model can be a generative model configured to generate images based on texts, e.g., stable diffusion model.

Generally, the driving image mentioned above represents images shot from vehicle perspective (e.g., driving recorder). Although images from third-perspective of many traffic accidents can be easily obtained, the driving image from first-perspective is hard to acquire.

Therefore, for driving situations that are rare or difficult to collect driving images (e.g., accident driving images), the decision generating device 1 can generate an estimate driving video (i.e., the situational image) in a continuous time series based on a text record such as a litigant statement, police accident record, etc. The situational text can comprise information relative to objects, road type, movement status of the objects, environment around the vehicle, and other information of the driving situation.

Specifically, the decision generating device 1 can generate multiple situational object information corresponding to the situational image through the same operations as the step S201 shown in FIG. 2 and the step S301 shown in FIG. 3. Furthermore, the decision generating device 1 can also perform text processing on the situational object information through the same operations as the step S202 shown in FIG. 2 and the step S302 shown in FIG. 3 to tokenize the situational object information. Finally, the decision generating device 1 can take the situational object information and the situational text as training data to fine-tune the prediction model PM.

In some embodiments, the decision generating device 1 can be applied to self-driving vehicles. Specifically, the processor 12 can generate a control signal based on the driving decision DD, and the driving decision DD is configured to control a powertrain system of the vehicle. For example, when the driving decision DD suggests turning right, the processor 12 can generate a control signal of turning the steering wheel of the vehicle to the right; or when the driving decision DD suggests decelerating, the processor 12 can generate a control signal of controlling the accelerator and the break of the vehicle to slow down the vehicle.

Figure 4:
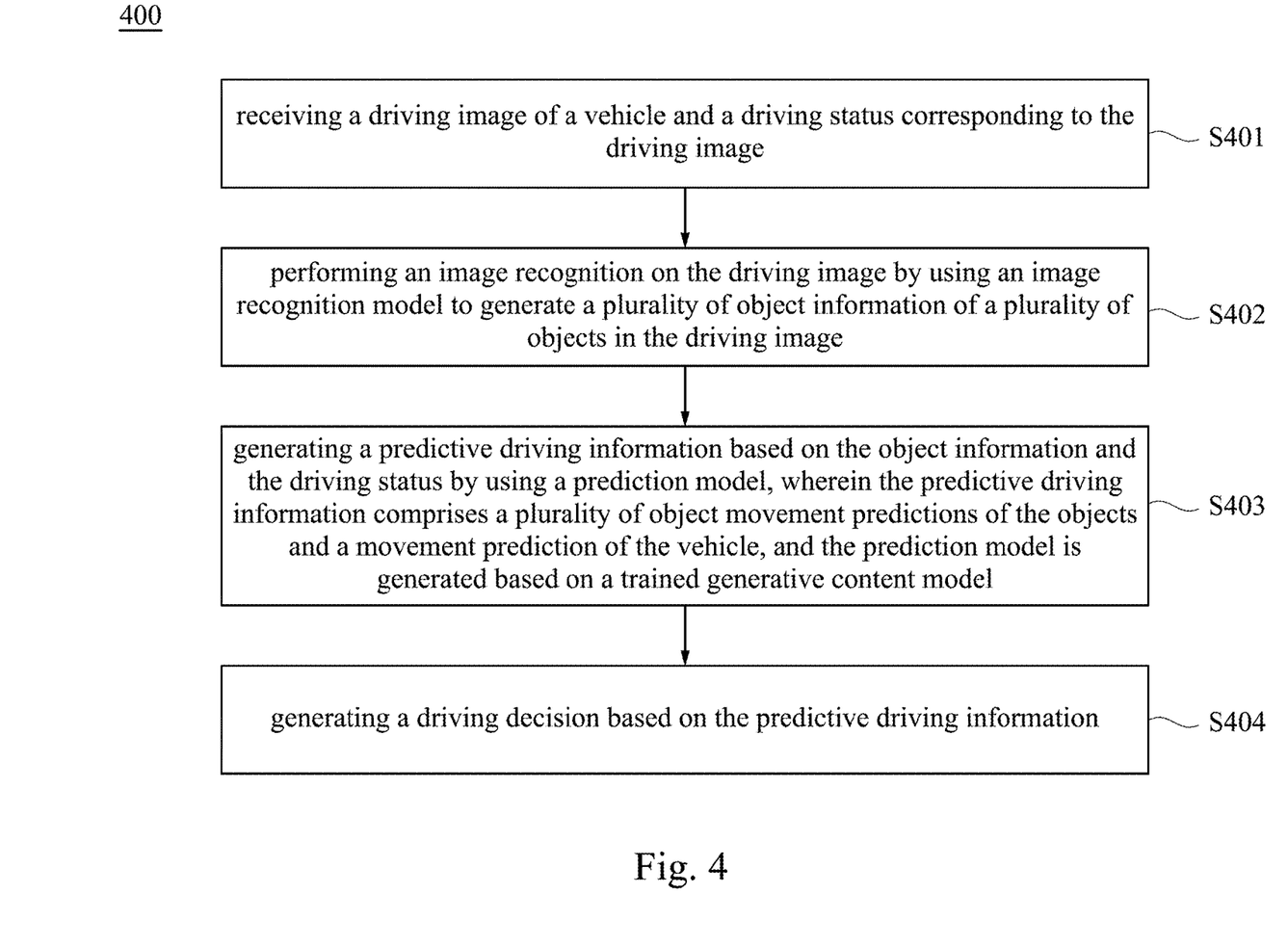
FIG. 4 is a flow diagram illustrating a decision generating method according to some embodiments of the present disclosure.

Reference is made to FIG. 4. FIG. 4 is a flow diagram illustrating a decision generating method 400 according to some embodiments of the present disclosure. The decision generating method 400 comprises steps S401-S404. The decision generating method 400 is configured to generate a driving decision advice based on driving images and relative information of the vehicle. The decision generating method 400 can be executed by a processor (e.g., the processor 12 shown in FIG. 1).

First, in the step S401, the processor receives a driving image of a vehicle and a driving status corresponding to the driving image.

Next, in the step S402, the processor performs an image recognition on the driving image by using an image recognition model to generate a plurality of object information of a plurality of objects in the driving image.

Next, in the step S403, the processor generates a predictive driving information based on the object information and the driving status by using a prediction model, wherein the predictive driving information comprises a plurality of object movement predictions of the objects and a movement prediction of the vehicle, and the prediction model is generated based on a trained generative content model.

Finally, in the step S404, the processor generates a driving decision based on the predictive driving information.

In some embodiments, the processor electrically connects to a storage (e.g., the storage of the first embodiment), the storage is configured to store a plurality of history driving images and a plurality of history driving statuses corresponding to the history driving images, and the prediction model is generated through the following steps: performing the image recognition on the history driving image by using the image recognition model to generate a plurality of history object information of a plurality of history objects in the history driving image; and training the generative content model based on the history object information and the history driving statuses to generate the prediction model.

In some embodiments, the step of generating the prediction model further comprises: performing a text processing to transform the history object information and the history driving statuses into a training text; and training the generative content model based on the training text to generate the prediction model.

In some embodiments, the storage further stores a plurality of history detection data corresponding to the history driving image, and the prediction model is generated through the following step: training the generative content model based on the history object information, the history driving statuses, and the history detection data to generate the prediction model.

In some embodiments, the step S403 further comprises: the processor performing a text processing to transform the object information and the driving status into an input text; and the processor inputting the input text into the prediction model to generate the predictive driving information in a text format.

In some embodiments, the step S403 further comprises: the processor generating the predictive driving information by using the prediction model based on the object information, the driving status, a positioning information of the vehicle, and a driving assistance information, wherein the object information, the driving status, the positioning information, and the driving assistance information are transformed into an input text through a text processing.

In some embodiments, the decision generating method 400 further comprises: the processor comparing the driving decision and a practical driving operation of the vehicle to generate an operation difference; and in response to the operation difference higher than a threshold, the processor fine-tuning the prediction model based on the driving image, the driving status, and the practical driving operation corresponding to the driving decision.

In some embodiments, the step of fine-tuning the prediction model further comprises: the processor generating the operation difference between the driving decision and the practical driving operation of the vehicle based on a loss function.

In some embodiments, the decision generating method 400 further comprises: the processor generating a situational image described by a situational text by using an image generating model based on the situational text; and the processor fine-tuning the prediction model based on the situational image and the situational text.

In some embodiments, the decision generating method 400 further comprises: the processor generating a time sequential situational image described by the situational text by using an image generating model based on the situational text.

In some embodiments, the decision generating method 400 further comprises: the processor generating a control signal to control a powertrain system of the vehicle, wherein the control signal is generated based on the driving decision.

In some embodiments, the object movement predictions comprise a future trajectory data of the objects in future, and the movement prediction of the vehicle comprises the future trajectory data of the vehicle in future.

In summary, the decision generating device and method provided by the present disclosure can predict whether the vehicle will be at risk of accidents in the future based on the driving image of the vehicle. Also, since the decision advice is generated by the generative content model, in addition to the driving image and the driving status of the vehicle, the decision generating device 1 can also refer to driving assistance information such as navigation routes and user preferences to generate the corresponding driving decision. Furthermore, the decision generating device 1 can also transform the situational text into images and fine-tune the prediction model accordingly for supplementing some driving situations where it is difficult to obtain the corresponding driving images. Accordingly, the training data can be more complete, and the prediction model can be more accurate for generating the driving decisions in response to driving emergencies.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A decision generating device, comprising:
   a transceiver interface; and
   a processor, electrically connected to the transceiver interface, configured to execute the following operations:
   receiving a driving image of a vehicle and a driving status corresponding to the driving image from the transceiver interface;
   performing an image recognition on the driving image by using an image recognition model to generate a plurality of object information of a plurality of objects in the driving image;
   generating a predictive driving information based on the object information and the driving status by using a prediction model, wherein the predictive driving information comprises a plurality of object movement predictions of the objects and a movement prediction of the vehicle, and the prediction model is generated based on a trained generative content model; and
   generating a driving decision based on the predictive driving information,
   wherein the operation of generating the predictive driving information further comprises:
   performing a text processing to transform the object information and the driving status into an input text; and
   inputting the input text into the prediction model to generate the predictive driving information in a text format.

2. The decision generating device of claim 1, further comprising:
   a storage, electrically connected to the processor, configured to store a plurality of history driving images and a plurality of history driving statuses corresponding to the history driving images, and the prediction model is generated through the following operations:
   performing the image recognition on the history driving image by using the image recognition model to generate a plurality of history object information of a plurality of history objects in the history driving image; and
   training the generative content model based on the history object information and the history driving statuses to generate the prediction model.

3. The decision generating device of claim 2, wherein the operation of generating the prediction model further comprises:
   performing a text processing to transform the history object information and the history driving statuses into a training text; and
   training the generative content model based on the training text to generate the prediction model.

4. The decision generating device of claim 2, wherein the storage further stores a plurality of history detection data corresponding to the history driving image, and the prediction model is generated through the following operation:
   training the generative content model based on the history object information, the history driving statuses, and the history detection data to generate the prediction model.

5. The decision generating device of claim 1, wherein the operation of generating the predictive driving information further comprises:
   generating the predictive driving information by using the prediction model based on the object information, the driving status, a positioning information of the vehicle, and a driving assistance information, wherein the object information, the driving status, the positioning information, and the driving assistance information are transformed into an input text through a text processing.

6. The decision generating device of claim 1, wherein the processor is further configured to execute the following operations:
   comparing the driving decision and a driving operation of a driver to generate an operation difference; and
   in response to the operation difference higher than a threshold, fine-tuning the prediction model based on the driving image, the driving status, and the driving operation corresponding to the driving decision.

7. The decision generating device of claim 1, wherein the processor further receives a situational text from the transceiver interface, and the processor is further configured to execute the following operations:
   generating a time sequential situational image described by the situational text by using an image generating model based on the situational text.

8. The decision generating device of claim 1, wherein the processor further generates a control signal to control a powertrain system of the vehicle, wherein the control signal is generated based on the driving decision.

9. The decision generating device of claim 1, wherein the object movement predictions comprise a future trajectory data of the objects in future, and the movement prediction of the vehicle comprises the future trajectory data of the vehicle in future.

10. A decision generating method, being adapted for use in a processor, comprising:
    receiving a driving image of a vehicle and a driving status corresponding to the driving image;
    performing an image recognition on the driving image by using an image recognition model to generate a plurality of object information of a plurality of objects in the driving image;
    generating a predictive driving information based on the object information and the driving status by using a prediction model, wherein the predictive driving information comprises a plurality of object movement predictions of the objects and a movement prediction of the vehicle, and the prediction model is generated based on a trained generative content model; and
    generating a driving decision based on the predictive driving information,
    wherein the step of generating the predictive driving information further comprises:

performing a text processing to transform the object information and the driving status into an input text; and inputting the input text into the prediction model to generate the predictive driving information in a text format.

11. The decision generating method of claim 10, wherein the processor is further electrically connected to a storage, the storage is configured to store a plurality of history driving images and a plurality of history driving statuses corresponding to the history driving images, and the prediction model is generated through the following steps:

performing the image recognition on the history driving image by using the image recognition model to generate a plurality of history object information of a plurality of history objects in the history driving image; and training the generative content model based on the history object information and the history driving statuses to generate the prediction model.

12. The decision generating method of claim 11, wherein the step of generating the prediction model further comprises:

performing a text processing to transform the history object information and the history driving statuses into a training text; and training the generative content model based on the training text to generate the prediction model.

13. The decision generating method of claim 11, wherein the storage further stores a plurality of history detection data corresponding to the history driving image, and the prediction model is generated through the following step:

training the generative content model based on the history object information, the history driving statuses, and the history detection data to generate the prediction model.

14. The decision generating method of claim 10, wherein the step of generating the predictive driving information further comprises:

generating the predictive driving information by using the prediction model based on the object information, the driving status, a positioning information of the vehicle, and a driving assistance information, wherein the object information, the driving status, the positioning information, and the driving assistance information are transformed into an input text through a text processing.

15. The decision generating method of claim 10, further comprising:

comparing the driving decision and a driving operation of a driver to generate an operation difference; and in response to the operation difference higher than a threshold, fine-tuning the prediction model based on the driving image, the driving status, and the driving operation corresponding to the driving decision.

16. The decision generating method of claim 10, further comprising:

generating a time sequential situational image described by a situational text by using an image generating model based on the situational text.

17. The decision generating method of claim 10, further comprising:

generating a control signal to control a powertrain system of the vehicle, wherein the control signal is generated based on the driving decision.

18. The decision generating method of claim 10, wherein the object movement predictions comprise a future trajectory data of the objects in future, and the movement prediction of the vehicle comprises the future trajectory data of the vehicle in future.

* * * * *